Patented Feb. 4, 1947

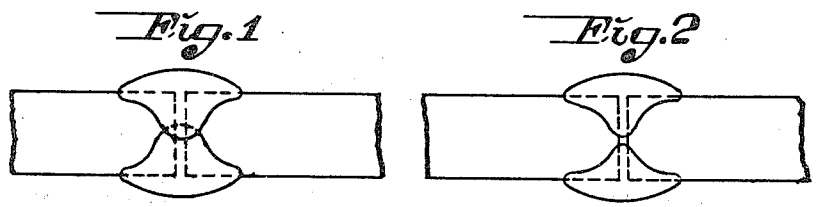
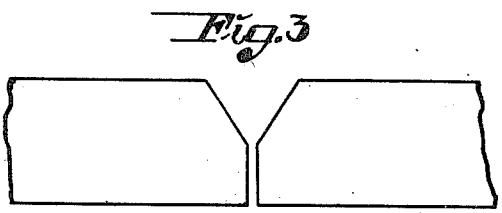
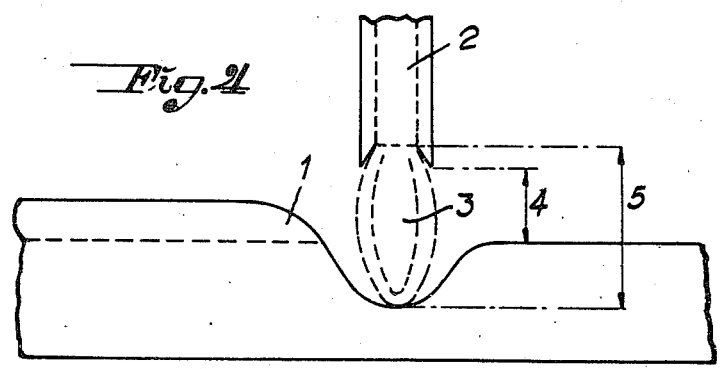
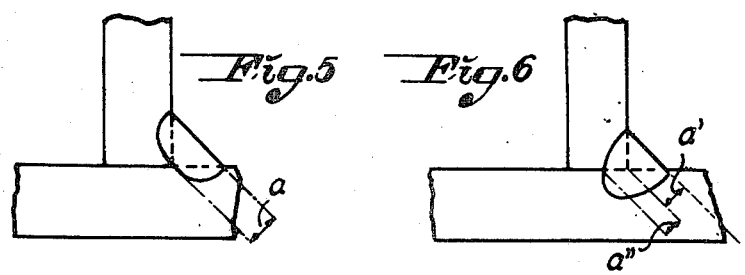

2,415,149

UNITED STATES PATENT OFFICE 2,415,149

ARC WELDING ELECTRODE

Per Yngve Sjöman, Gothenburg, Sweden, assignor to Elektriska Svetsningsaktiebolaget, Gothenburg, Sweden, a corporation of Sweden Application February 14, 1945, Serial No. 577,753
In Sweden February 29, 1944

2 Claims. (Cl. 219—8)

This invention relates in general to arc welding electrodes and more particularly to thick coated electrodes suited for the welding of square butt joints and other purposes where a deep penetration is required, as in fillet welding and plate cutting.

It is a demand for electrodes enabling the welding of joints formed by unbevelled plates, i. e. square butt joints, even when the plates are thick since the bevelling of the edges of the plates otherwise to be performed can then be dispensed with and considerable working costs be saved. Owing to the small original volume of the joint only minor quantities of filling material have to be used and therefore a considerable saving in material costs will also result. Ordinary electrodes, however, have too poor a penetrating capacity to allow plates over a given thickness to be welded by this method.

It is an object of the invention to provide a coated electrode by means of which square butt joints can be readily carried out in relatively thick plates and particularly strong fillet welds can be made. A further object is to produce an electrode having extraordinarily high penetrating capacity. Another object is that the electrode should permit a remarkably high arc voltage to be used at normal arc length. A still further object is so to compose and arrange the coating of the electrode that the above objects will be obtained.

In order to arrive at these and other objects which will be evident from the following description the present invention resides in first hand in choosing such substances for the coating that have a low capacity of electron emission. The objects of the invention will also be attained by employing in the coating substances promoting the formation of a crater at the top of the electrode. The stipulation of a minimum thickness of the coating and the use of core diameters within rather narrow limits are also important expedients.

The invention will now be explained with reference to the accompanying drawing but it is to be understood that the invention is not limited to the special embodiments thus described.

In the drawing Figures 1 and 2 are diagrammatic cross-sections through a correct and a false square butt weld, respectively. Figure 3 shows two bevelled plates in position for welding. Figure 4 is a cross-section of an electrode in use illustrating some terms employed and Figures 5 and 6 are diagrammatic cross-sections through an ordinary fillet weld and one obtainable by the invention, respectively.

In order that the joint shall be perfect it is necessary that the beads laid from opposite sides meet and fuse together at the contact zones as shown in Figure 1. For thicker plates the penetrating capacity of the electrodes hitherto used has not been sufficient, so that unbound zones have frequently been obtained in the middle of the weld joint as shown in Figure 2. The strength of the seam will thereby be considerably decreased. It is, of course, possible to use joints of the type shown in Figure 3 or to separate the plates so as to form a more or less wide interspace between them but many of the advantages of the square butt joint are then lost, since more filling material is required for filling the joint and a lower welding speed has to be used.

The greatest plate thickness that can be welded by the use of a square butt joint and ordinary thick-coated electrodes having a core wire diameter of 4 millimeters is about 6 millimeters if the welding is carried out from both sides of the work piece and 2 to 3 millimeters if welding takes place only from one side. The highest strength of current that can be used in such welding by using an automatic welder is about 220 amperes and the highest welding velocity about 15 to 20 centimeters per minute if a weld bead of an even appearance is desired. The coating quantity of such an ordinary electrode amounts to 40 to 50% of the weight of the coated portion of the core wire if the coating is of inorganic type and to 20 to 25% if it is of organic type. If the welding velocity is increased above 15 to 20 centimeters per minute a weld bead of uneven appearance will be obtained at first as the slag formed is incapable of covering the whole bead even if the penetrating capacity is sufficient. If the welding speed is further increased the penetration depth will decrease and unbound zones will arise.

The present invention, however offers a possibility to increase the penetrating capacity and this will be accomplished by carrying out the welding or cutting, respectively, with an arc voltage over 50 volt, preferably over 55 to 60 volt, at normal arc length. In the arc welding art normal arc length means the distance between the end of the electrode taken from the edge portion of the electrode crater and the surface of the work piece (plate). The actual arc length is the sum of said distance and the depths of the craters of the electrode and of the work piece. The normal arc length expressed in millimeters is about equal to the core wire diameter of the electrode ±1 to 2 millimeters. The term arc length usually means normal arc length.

In Fig. 4 reference numeral 1 indicates a work piece, 2 a welding electrode and 3 the arc. The normal arc length is indicated by the measure 4 and the actual arc length by 5.

It is recognized that the penetrating capacity of an electrode depends on the dimensions of the work piece, the strength of current used, the welding velocity and the electrode type. The higher the arc voltage at normal arc length produced by the electrode is the higher the penetrating capacity will be since the relatively greater melting of the work piece then required calls for a greater quantity of energy.

By choosing according to the invention a suitable composition and a sufficient quantity of the coating the arc voltage at normal arc length can easily be increased up to twice the voltage used for normal thick-coated electrodes and even higher. An arc voltage of 55 to 65 volts is about twice the normal one and by using such high voltages twice the normal power will be supplied to the welding spot. Said tension of 55 to 65 volts is obtained at the current strengths suited for the different electrode dimensions, i. e. for electrodes having 3.25 millimeter core wire, 140–180 amperes; electrodes having 4 millimeter core wire, 130–240 amperes; electrodes having 5 millimeter core wire, 240–320 amperes.

By merely increasing the coating quantity, for instance of an electrode having a coating of inorganic type up to 75% of the weight of the coated portion of the core wire a somewhat deeper crater is obtained on the electrode whereby the arc voltage is increased a little and, consequently, a somewhat increased penetration capacity is obtained but the increase is not sufficient for permitting thick plates to be welded. On the other hand a greater fluidity is obtained, so that the welding can be performed with a greater velocity without obtaining an uneven bead. It is then possible to weld 6 millimeter plates at 220 amperes and a welding speed of 20 to 25 centimeters per minute using 4 millimeter electrodes without obtaining an uneven bead. By increasing the coating thickness it is thus possible somewhat to increase the welding velocity and the penetrating capacity of an electrode but the coating quantity cannot suitably be increased much over 75% because the melting down speed of the electrode then decreases too much and the electrode easily becomes red hot even at normal current strengths. The corresponding effect is obtained by electrodes having a coating of organic type if the quantity of coating is increased to 35 to 50%.

According to the invention the increase of the arc voltage at normal arc length is, however, achieved in first hand by adding to the coating composition substances having an increasing influence on the arc voltage. Such substances are particularly those having a low capacity of electron emission, e. g. Na₂O, SiO₂, Al₂O₃, Cr₂O₃, C, H or compounds containing these substances, such as sodium silicate, aluminium silicates, for instance kaolin, organic materials, etc. Other substances increase the arc voltage by facilitating the formation of a deep crater on the electrode end. The deeper this is the greater the actual arc length and consequently also the arc voltage become.

Substances having a somewhat higher capacity of electron emission than the above mentioned, such as iron oxides, manganese oxides, titanium dioxide, etc., or compounds containing these substances should therefore be avoided in the coating unless said substances are crater-forming in a high degree and therefore have an increasing influence on the arc voltage and consequently on the penetrating capacity. Such a substance is, for instance, iron carbonate. Substances having a very high capacity of electron emission, such as particularly calcium oxide, strontium oxide, barium oxide, but also cerium or thorium oxides or compounds containing said oxides, are to be avoided in or rather completely excluded from the electrode coating even if these substances facilitate the formation of a crater since their high capacities of electron emission lower the arc voltage too much. Ferro-alloys of a suitable kind may be added to the coating as they have usually no decreasing influence on the arc voltage and thus no impairing influence on the penetrating capacity. Some ferro-alloys, for instance ferro-manganese containing 6 to 7% C., have a somewhat increasing influence on the voltage and the penetrating capacity. Organic substances such as cellulose, wood flour, starch, dextrine, i. e. generally carbohydrates, which are often used in electrode coatings and burn at welding, are crater forming and may therefore suitably be employed in an electrode coating when high penetrating capacity is desired.

The arc voltage can also be increased if the coating develops such gases that are not easily ionised, e. g. hydrogen. Under the influence of the arc hydrogen can be formed from hydrogen compounds, such as hydrocarbons and steam originating from organic or aqueous constituents in the coating.

Simply to keep the electrode at a further distance from the work piece than corresponding to the normal arc length in order to increase the arc voltage is not convenient as the arc then becomes unstable and spreads over a wider surface thus diminishing the penetration.

By employing the principles of the invention on the composition and the amount of the coating it has been possible to manufacture electrodes giving a penetration three times as deep as normal thick-coated electrodes at otherwise equal welding conditions.

A preferred coating composition of inorganic type is, for instance, such a one containing ferro-manganese, quartz, kaolin and siderite (iron carbonate) as well as sodium silicate as a binder. Potassium silicate having a high capacity of electron emission should not be used as binder. On the other hand dextrine or other organic binders may be used. In order simultaneously to obtain good mechanical properties of the weld material the solid substances should be mixed in the following rates:

| | Per cent |
|---|---|
| Ferro-manganese poor in carbon | 25 to 40 |
| Quartz | 20 to 30 |
| Kaolin | 0 to 10 |
| Siderite (iron carbonate) | 30 to 50 |

For this mixture preferably 50 to 100 grams of sodium silicate are used, calculated on dry weight per kilograms of the above mixture. The quantity of coating should preferably amount to about 75% according to the above-mentioned calculation method in order to increase the fluidity as well as the penetration. A wire of ordinary soft iron containing about 0.10% C, 0.40% Mn, traces of Si and maximum 0.04% of each of S and P can preferably be used as core wire.

A coating above gives at chemical analysis the following composition:

| | Per cent |
|---|---|
| $SiO_2$ | 23 to 50 |
| $Al_2O_3$ | 0 to 5 |
| FeO | 16 to 36 |
| $CO_2$ from carbonate | 8 to 17 |
| MnO | 22 to 49 |
| $Na_2O$ | 1 to 4 |

An upper limit for the arc voltage is produced by the fact that most welding generators do not deliver more than about 70 volts and that, according to general opinion, the arc voltage must be considerably less than this value in order to obtain a sufficient arc stability. A particular advantage of the electrodes according to the present invention is therefore the pronounced crater formation having such a stabilizing effect on the arc that the difference between the no-load voltage of the welding generator and the arc voltage can be considerably lower than by using ordinary thick-coated electrodes. A completely stable arc is obtained with electrodes according to the above description at an arc voltage of 55 to 65 volts at normal arc length and using ordinary welding generators.

In order that the low capacity of electron emission of the coating substances shall exert its full effect as to the increase of arc voltage the electrodes should be welded with direct current and be connected to the negative pole. The electrodes may also be connected to the positive pole or be welded with alternating current but then a somewhat lower effective power is obtained than by connecting to the negative pole. According to the invention there is nothing to prevent the choice of such coating substances and such a coating quantity that the arc voltage will amount to 70 to 100 volts or higher but then special welding generators will be required. The invention also comprises such electrodes.

With electrodes according to the examples closely stated above it is possible to weld, for instance, 6 millimeter plates with 3.25 millimeter electrodes and an advancing speed of 30 to 35 centimeters per minute at a current strength of 145 to 155 amperes and then obtain a weld bead of a very even appearance. With 4 millimeter electrodes it is possible to use a velocity of 35 to 40 centimeters and 180 amperes. Then the plates to be welded are placed closely to each other with unbevelled edges and the welding is performed with one bead from each side. In X-raying and cutting such weld joints no untightnesses and unbound zones have been found. With 4 millimeter electrodes 10 millimeter plates can equally well be welded with a velocity of 35 to 40 centimeters per minute at a current strength of about 220 amperes and 12.5 millimeter plates with a welding velocity of 25 to 30 centimeters and a current strength of about 240 amperes. The mechanical properties of the weld joint are superior to those required by various controlling authorities on weld joints in plates of the steel qualities St. 37 and St. 44, that is, minimum tensile strength 37 and 44 kilograms per square millimeter, respectively.

A certain optimum of the penetrating capacity seems to be obtained with 4 millimeter electrodes. With an increased diameter of the core wire the penetration depth will not essentially be increased but the breadth of the weld and the welding velocity are increased. Thus 12.5 millimeter plates can be welded with 5 millimeter electrodes and a velocity of 35 to 40 centimeters per minute and a current strength of about 290 amperes. All the above welding velocities and current strengths are valid if a weld bead of an even appearance is desired. If this demand is not considered the current strength as well as the welding speed can be increased considerably, the latter by 50% or more, in certain cases by 100%, without rendering the values of the mechanical properties of the weld unsatisfactory. The mechanical properties of the weld material show a strength of 45 to 50 kilograms per square millimeter and a ductility of 25 to 30% measured on a so-called all-weld-metal test piece and using a measuring length of 5 times the diameter of the test rod. As welded in steel of the quality St. 37 the weld shows a strength of 50 to 60 kilograms per square millimeter and a ductility of 40 to 50%, measured on drilled test specimen, according to the Swedish standard test (with 5 millimeter holes).

Also in deep fillet welding technic the present electrodes can be used as illustrated in Figures 5 and 6.

Electrodes of this kind are also very well suited for cutting. The above stated composition can with advantage be used but with ferro-manganese, however, rich in carbon instead of poor in carbon. Thereby considerably higher cutting velocities can be obtained than those at present obtainable in arc cutting.

What is claimed is:

1. An electrode for arc welding provided with a flux coating containing in addition to a binder:

| | Per cent |
|---|---|
| Ferro-manganese poor in carbon | 25 to 40 |
| Quartz | 20 to 30 |
| Kaolin | 0 to 10 |
| Siderite (iron carbonate) | 30 to 50 |

2. An electrode for arc welding provided with a flux coating having the following analysis:

| | Per cent |
|---|---|
| $SiO_2$ | 23 to 50 |
| $Al_2O_3$ | 0 to 5 |
| FeO from metallic iron | 2 to 11 |
| FeO from iron compounds | 14 to 25 |
| $CO_2$ from carbonate | 8 to 17 |
| MnO from metallic manganese | 22 to 49 |
| $Na_2O$ | 1 to 4 |

PER YNGVE SJÖMAN.

REFERENCES CITED

The following references are of record in the file of this patent:

UNITED STATES PATENTS

| Number | Name | Date |
|---|---|---|
| 1,972,067 | Pennington | Aug. 28, 1934 |
| 1,978,318 | Miller | Oct. 23, 1934 |
| 2,021,628 | Larson | Nov. 19, 1935 |
| 2,060,681 | Miller | Nov. 10, 1936 |
| 2,107,434 | Wilson | Feb. 8, 1938 |
| 2,152,286 | Schoenmaker | Mar. 28, 1939 |

FOREIGN PATENTS

| Number | Country | Date |
|---|---|---|
| 488,871 | British | July 15, 1938 |